(12) United States Patent
Ohhira

(10) Patent No.: US 6,882,802 B2
(45) Date of Patent: Apr. 19, 2005

(54) MODULATOR AND METHOD OF MODULATING OPTICAL CARRIER WITH CLOCK SIGNAL BEFORE OR AFTER THE CARRIER IS MODULATED WITH DATA PULSE

(75) Inventor: Risato Ohhira, Tokyo (JP)

(73) Assignee: NEC Corporation, Tokyo (JP)

( * ) Notice: Subject to any disclaimer, the term of this patent is extended or adjusted under 35 U.S.C. 154(b) by 746 days.

(21) Appl. No.: 09/948,233

(22) Filed: Sep. 7, 2001

(65) Prior Publication Data

US 2002/0030878 A1 Mar. 14, 2002

(30) Foreign Application Priority Data

Sep. 14, 2000 (JP) ........................................ 2000-280558

(51) Int. Cl.[7] .............................................. H04B 10/04
(52) U.S. Cl. ........................ 398/188; 398/183; 398/186
(58) Field of Search ................................. 398/182, 183, 398/185, 186, 187, 188, 189, 190, 191

(56) References Cited

U.S. PATENT DOCUMENTS

| | | | | |
|---|---|---|---|---|
| 5,473,458 A | * | 12/1995 | Mamyshev et al. | ......... 398/160 |
| 6,459,519 B1 | * | 10/2002 | Sasai et al. | ................. 398/183 |
| 6,744,992 B1 | * | 6/2004 | Bergano | .................... 398/183 |

FOREIGN PATENT DOCUMENTS

| | | |
|---|---|---|
| JP | 8-254673 | 10/1996 |
| JP | 11-252013 | 9/1999 |
| JP | 2000-68940 | 3/2000 |
| JP | 2000-106543 | 4/2000 |
| JP | 2001-244894 | 9/2001 |
| JP | 2002-23121 | 1/2002 |

OTHER PUBLICATIONS

Y. Miyamoto, et al., "320 Gbit/s (8×40 Gbit/s) WDM Transmission Over 367km with 120km Repeater Spacing Using Carrier–Suppressed Return–To–Zero Format", *Electronics Letters,* vol. 35, No. 23, Nov. 11, 1999, pp. 2041–2042.

Yonenaga et al., Electronics Letters, vol. 36, No. 2, pp. 153–155 (2000).

Copy of Japanese Office Action dated Oct. 12, 2004 (and English translation of relevant portion).

* cited by examiner

*Primary Examiner*—M. R. Sedighian
*Assistant Examiner*—Christina Y Leung
(74) *Attorney, Agent, or Firm*—Dickstein, Shapiro, Morin & Oshinsky, LLP.

(57) ABSTRACT

In an optical transmitter which modulates a continuous-wave optical carrier with an electrical data pulse, the carrier is modulated with a clock signal having $½^n$ (where n is an integer equal to or greater than unity) of the frequency of a fundamental sinusoidal component of the data pulse so that the modulated carrier contains at least a center frequency spectral component. On the modulated optical carrier a filtering operation is performed so that the filtered carrier contains a carrier frequency component and first sideband components. Before or after the clock modulation is performed, the data pulse is used to perform data modulation on the optical carrier.

37 Claims, 8 Drawing Sheets

MODULATOR AND METHOD OF MODULATING OPTICAL CARRIER WITH CLOCK SIGNAL BEFORE OR AFTER THE CARRIER IS MODULATED WITH DATA PULSE

BACKGROUND OF THE INVENTION

1. Field of the Invention

The present invention relates generally to optical transmitters for converting electrical data pulses to optical data pulses by intensity modulating a continuous wave optical carrier frequency signal, and more particularly to an optical clock modulator for use in an optical transmitter for modulating the optical carrier frequency signal with an electrical clock signal.

2. Description of the Related Art

Optical carrier-suppressed return-to-zero (CS-RZ) modulation is known as an excellent technique tolerant of waveform distortion caused by combined effects of wavelength dispersion and non-linear effects (self-phase modulation and cross-phase modulation, in particular), as described in an article titled "320 Gbps (8×40 Gbps) WDM transmission over 367 km with 120 km repeater spacing using carrier-suppressed return-to-zero format", Y. Miyamoto et al., Electronics Letters, Vol. 35, No. 23, pp. 2041–2042, 1999. FIG. 1 shows the structure of the optical transmitter of CS-RZ format described in the Miyamoto et al article. The optical transmitter is comprised of a clock modulator 1 and a data modulator 2. The prior art clock modulator 1 includes an optical intensity modulator 3 and an electrical clock source 4 which generates a clock signal at a frequency which is one half of the frequency of a fundamental sinusoidal component of a data pulse supplied to the data modulator 2. For charp-less clock modulation in which phase inversions occur at bit intervals, the intensity modulator 3 operates in a push-pull mode to perform a modulation on a continuous-wave carrier frequency optical signal from a light source 6 with dual-phase clock signals, one of which is supplied direct from the clock source 4 and the other through a π-radian phase shifter 5. The output signal of the clock modulator 1, after being amplified by optical amplifier 7, undergoes data modulation through an intensity modulator 8 which operates in a push-pull mode using dual-phase non-return-to-zero (NRZ) data pulses, one being supplied direct from an external data source 9 and the other through a π-radian phase shifter 10. As a result of the push-pull operation, the output of the intensity modulator 8 is an optical carrier-suppressed return-to-zero (CS-RZ) signal, which is boosted by optical amplifier 11 for transmission to a receive site over an optical link.

Although the prior art CS-RZ format has a superior nonlinear tolerance for self-phase modulation enabling 1.4 dB higher power transmission compared to RZ signal format, there is still a need to provide a robust optical transmitter in terms of non-linearity tolerance and narrow spectral bandwidth for wavelength division multiplexing. In addition, the prior art CS-RZ optical transmitter requires delicate fine tuning of the π-phase shifter 5 for precisely adjusting the phase difference between the two clock signals and precisely adjusting their amplitudes and bias voltage supplied to the intensity modulator 3. Thus, it is desirable to eliminate the need for the delicate tuning of the clock modulator.

SUMMARY OF THE INVENTION

It is therefore an object of the present invention to provide a clock modulator for an optical transmitter for producing a modulated optical signal that is enhanced in nonlinear tolerance.

Another object of the present invention is to provide a clock modulator for producing a narrow band optical signal by limiting the optical spectrum of modulated light to the spectral range that encompasses the carrier frequency component and the first and/or second sideband components. This is advantageous for multiplexing optical signals on different wavelengths.

According to a first aspect, the present invention provides an optical clock modulator for use in an optical transmitter which modulates a continuous-wave optical carrier with an electrical data pulse. The optical clock modulator comprises a clock generator for producing a clock signal at $1/2^n$ (where n is an integer equal to or greater than unity) of the frequency of a fundamental sinusoidal component of the data pulse, an optical modulator for performing a modulation on the optical carrier with the clock signal to produce a modulated optical carrier containing at least a carrier frequency component and first sideband components, and an optical filter for extracting the carrier frequency component and the first sideband components from the modulated optical carrier.

According to a second aspect, the present invention provides an optical clock modulator for use in an optical transmitter which modulates a continuous-wave optical carrier with an electrical data pulse. The clock modulator comprises a clock generator for producing a clock signal having a fundamental sinusoidal component whose frequency is $1/2^n$ (where n is an integer equal to or greater than unity) of the frequency of a fundamental sinusoidal component of the data pulse. An optical modulator performs a modulation on the optical carrier with the clock signal so that the modulated carrier contains at least a carrier frequency component and first sideband components. From the modulated carrier an optical filter extract spectral components whose frequencies are equal to or lower than four times the frequency of the fundamental sinusoidal component of the data pulse.

To eliminate delicate fine adjustments, the optical modulator may comprise a single-clock driven phase modulator.

The optical modulator may be comprised of an intensity modulator having a phase chirp and operating at a bias voltage at which the output power of the modulator diminishes to a near-zero point.

The optical modulator may be comprised of an optical splitter for splitting the continuous-wave optical carrier into first and second split optical signals, an optical phase shifter that introduces a predetermined amount of phase shift to the clock signal, an optical intensity modulator for performing intensity modulation in a push-pull mode on the first split optical signal with the clock signal from the phase shifter and the clock signal from the clock generator. Further provided are gain adjustment means for adjusting a gain of the second split optical signal and phase adjustment means for adjusting a phase of the second split optical signal, and a multiplexer for combining the gain- and phase-adjusted second split optical signal and the intensity modulated first split optical signal.

According to a third aspect, the present invention provides an optical clock modulation method for an optical transmitter in which data modulation is performed using a data pulse, comprising the steps of producing a clock signal at $1/2^n$ (where n is an integer equal to or greater than unity) of the frequency of a fundamental sinusoidal component of the data pulse, performing a modulation on the optical carrier with the clock signal to produce a modulated optical carrier containing at least a carrier frequency component and first sideband components, and extracting the carrier frequency component and the first sideband components from the modulated optical carrier.

According to a fourth aspect, the present invention provides an optical clock modulation method for an optical transmitter in which data modulation is performed using a data pulse, comprising the steps of producing a clock signal at $1/2^n$ (where n is an integer equal to or greater than unity) of the frequency of a fundamental sinusoidal component of the data pulse, performing a modulation on a continuous-wave optical carrier with the clock signal to produce a modulated optical carrier containing at least a center frequency spectral component, and performing a filtering operation on the modulated carrier so that the filtered carrier contains spectral components whose frequencies are equal to or lower than four times the frequency of the fundamental sinusoidal component of the data pulse.

BRIEF DESCRIPTION OF THE DRAWIGNS

The present invention will be described in detail further with reference to the following drawings, in which.

DETAILED DESCRIPTION

Figure 1:
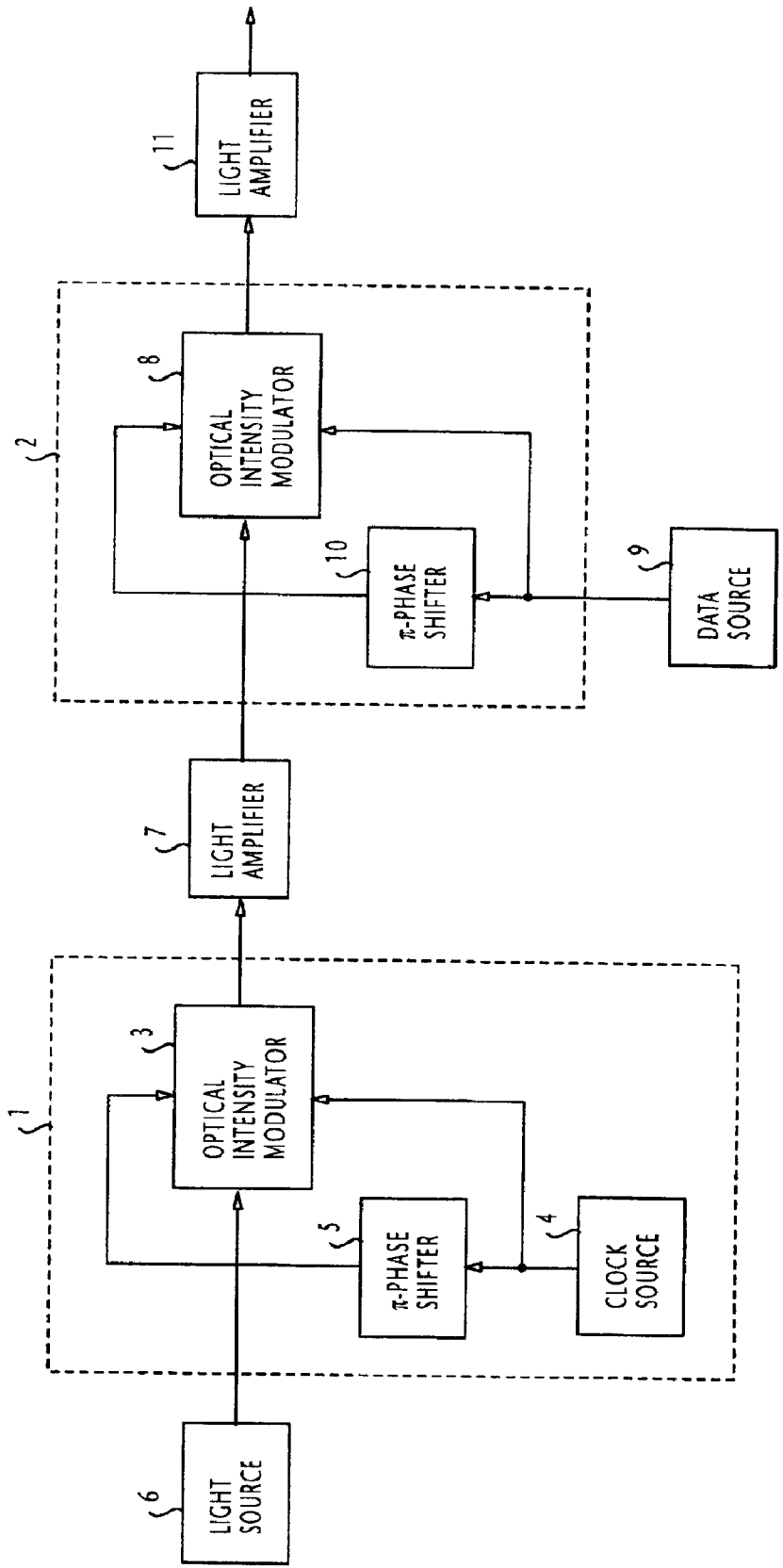
FIG. 1 is a block diagram of a prior art optical transmitter.
Figure 2:
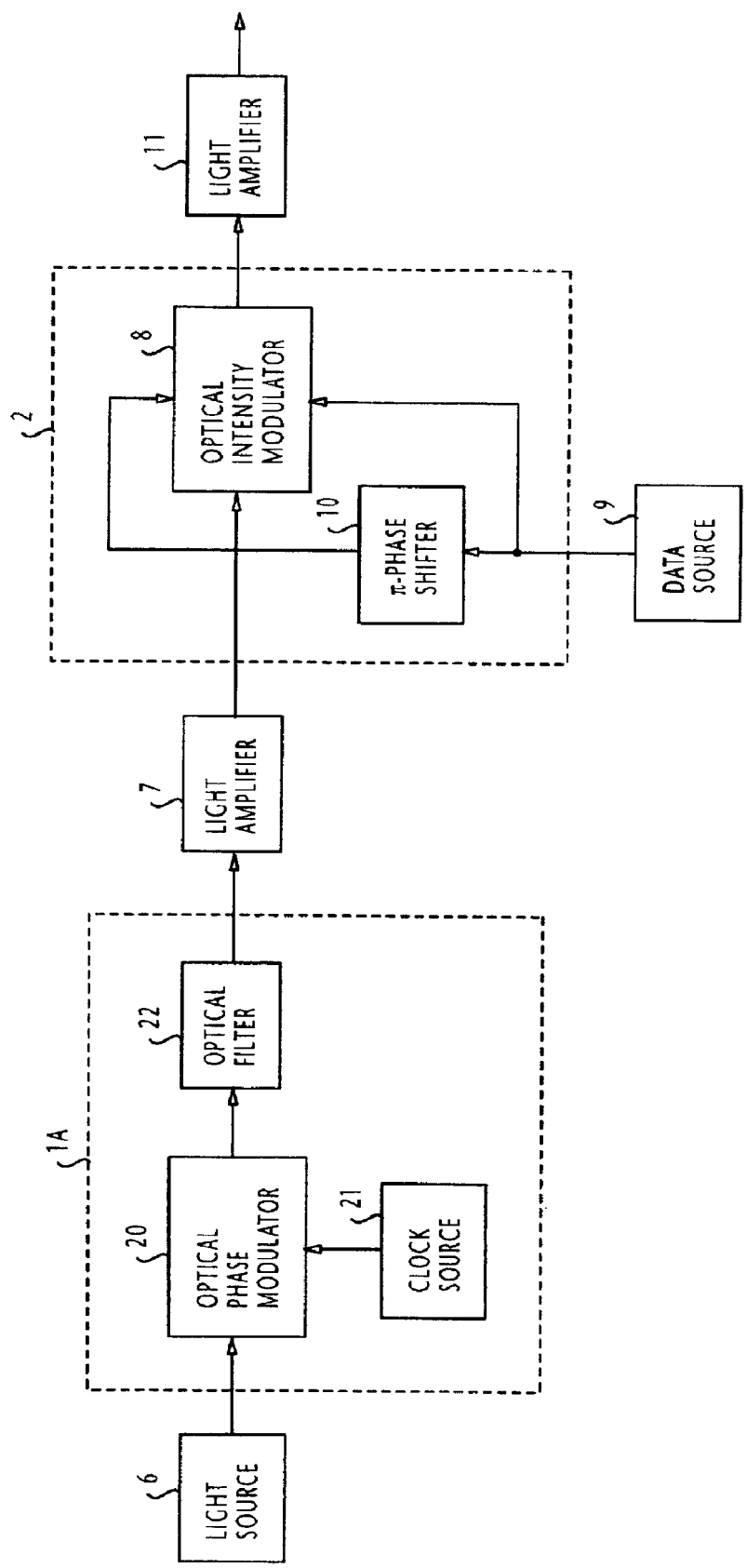
FIG. 2 is a block diagram of an optical transmitter according to a first embodiment of the present invention.

Referring now to FIG. 2, there is shown an optical transmitter according to a first embodiment of the present invention, wherein the same numerals are used to designate parts corresponding to those in FIG. 1. The optical transmitter of the first embodiment is comprised of an optical clock modulator 1A and the data modulator 2. Clock modulator 1A includes an optical phase modulator 20 which performs phase modulation on the optical carrier frequency signal from the light source 6 with a clock signal supplied from a clock source 21. The clock signal has a fundamental sinusoidal component whose frequency is $1/2^n$ (where n is an integer equal to or greater than unity) of the frequency of a fundamental sinusoidal component of the NRZ data pulse. Preferably, the clock signal has a pure sinusoidal waveform. If the data bit rate of the NRZ data pulse is 40 Gbps, the clock signal is generated at a frequency of 20 GHz.

Figure 3A:
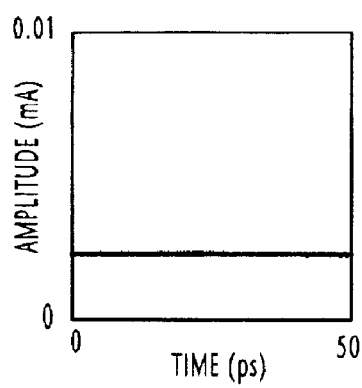
FIGS. 3a to 3f are graphic representations of the various operating characteristics of the optical transmitter of FIG. 2.
Figure 3B:
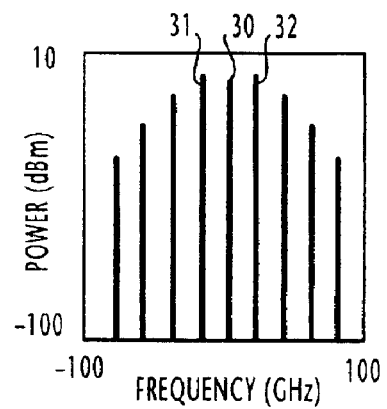

If the voltage required for the optical phase modulator 20 to impart a $\pi$ phase shift to the incident optical carrier is $V_\pi$, and the clock signal has an amplitude of $V_{clk}$, the phase modulation index can be represented by $\pi \times V_{clk}/V_\pi$. A preferred range of phase modulation indices is $0.3\pi$~$0.765\pi$. In this range the nonlinear tolerance of this invention is superior to the prior art. The optimum value of phase modulation index is around $0.5\pi$. When the phase modulation index is equal to about $0.765\pi$ (which corresponds to the first zero point of the first order Bessel function), carrier suppression occurs. FIGS. 3a and 3b respectively show eye-pattern penalty and an optical spectrum of the output signal of the optical phase modulator 20 using a 20-GHz pure sinusoidal clock signal and a phase modulation index of $0.5\pi$. It is seen in FIG. 3b that the power levels of the first sideband components indicated by spectral lines 31, 32 are substantially equal to the power level of the carrier frequency component indicated by a spectral line 30.

The output signal of optical phase modulator 20 is applied to an optical filter 22 where the spectrum components of the phase modulated optical carrier are limited. For improved nonlinear tolerance and for ease of filter design, the optical filter 22 allows passage of only the carrier frequency component and the first and second sideband components. Therefore, the spectral components contained in the output of optical intensity modulator 8 are equal to or lower than four times the frequency of the fundamental sinusoidal component of the data pulse. If the data bit rate of the NRZ data pulse is 40 Gbps, the spectral components contained in the output of optical filter 22 are equal to or lower than 160 GHz.

Figure 3C:
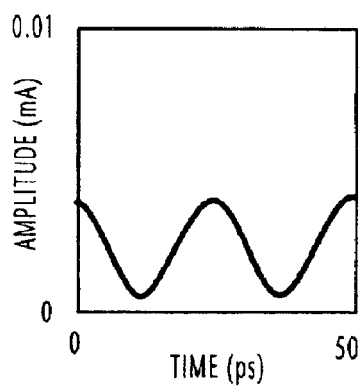
Figure 3D:
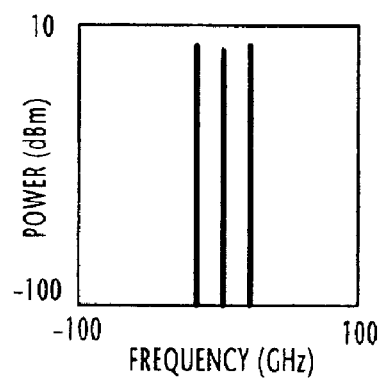

To obtain data-modulated signal having a narrow optical bandwidth and to achieve dispersion tolerance, it is preferred that the optical filter 22 allows passage of only the carrier frequency component and the first sideband components. In this case, the spectral components contained in the optical intensity modulator 8 are those components whose frequencies are equal to or lower than twice the frequency corresponding to the data bit rate, i.e., 80 GHz. FIGS. 3c and 3d respectively show eye-pattern penalty and optical spectrum of the output signal of the optical filter 22 when it contains only the carrier frequency component and the first sideband components.

Figure 3E:
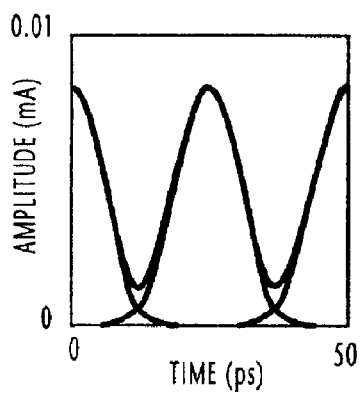
Figure 3F:
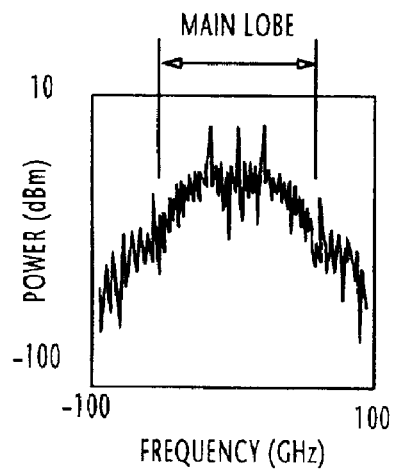

The output of optical clock modulator 1A is amplified and then subjected to a data modulation in the data modulator 2 in the same manner as described in FIG. 1. FIGS. 3e and 3f respectively show eye-pattern penalty and optical spectrum of the output of optical intensity modulator 8. This spectrum shows three peaks corresponding to the carrier frequency component and the first sideband components.

In computer simulations, 40-Gbps optical data pulses were transmitted over a 400-km length optical transmission link using five repeaters spaced at 80-km intervals. Each 80-km span consisted of a 50-km length standard single mode fiber and a 30-km length reverse dispersion fiber, with each single mode fiber having a dispersion of +16 ps/nm/km, a dispersion slope of +0.07 ps/nm$^2$/km, a loss of 0.2 dB/km, a core diameter of 10.4 $\mu$m, and a nonlinear-index coefficient of $2.62\times10^{-20}$ m$^2$/W and each reverse dispersion mode fiber having a dispersion of −26.66 ps/nm/km, a dispersion slope of −0.08 ps/nm$^2$/km, a loss of 0.3 dB/km, a core diameter of 5.64 $\mu$m, and a nonlinearity constant of $2.62\times10^{-20}$ m$^2$/W. The passband of optical filter 22 used in the simulations was 0.4 nm for passing the carrier frequency component and the first sideband components and the phase modulator 20 was driven by a 20-GHz sinewave clock signal at a phase modulation index of $0.5\pi$.

Figure 4:
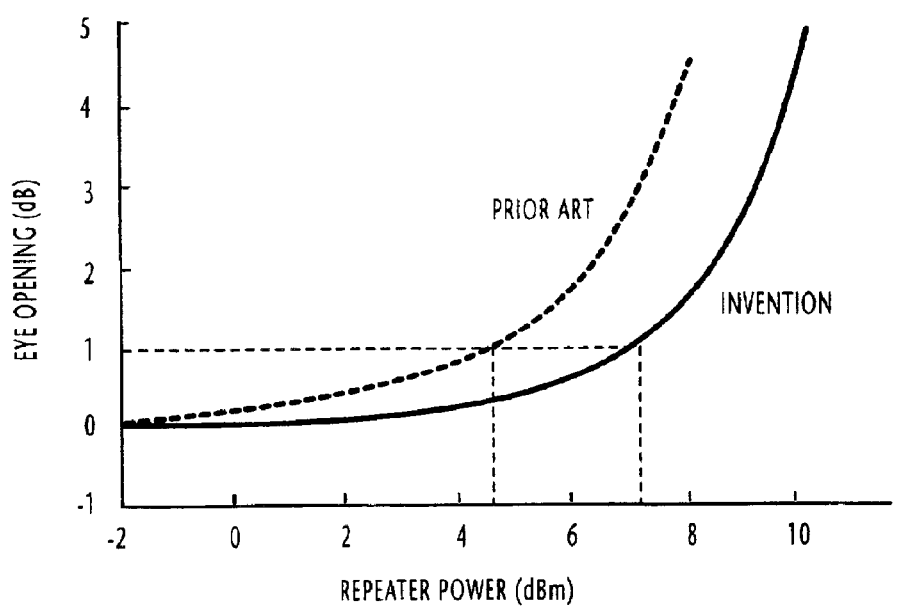
FIG. 4 is a graphic representation of transmission experiments of the present invention for comparison with the prior art of FIG. 1.

FIG. 4 is a graphic representation of eye-opening penalty representing deteriorating signal quality plotted as a function of repeater output power. Comparison is made between the prior art CS-RZ optical transmitter of FIG. 1 and the carrier-containing RZ optical transmitter of the present invention. The graph indicates that for a 1 dB deterioration of signal quality the present invention enables transmission of optical signals approximately 2.5 dB higher than is possible with the prior art, an improvement of 2.5 dB in terms of nonlinear tolerance. The reason for this is that within the spectrum of the modulated optical carrier the power levels of the sideband components are substantially equal to the power level of the carrier frequency component.

Figure 5:
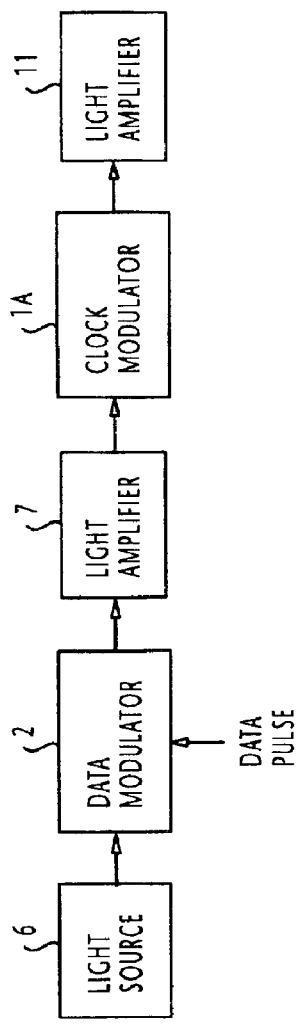
FIGS. 5, 6 and 7 are block diagrams of alternative forms of the first embodiment of the present invention.
Figure 6:
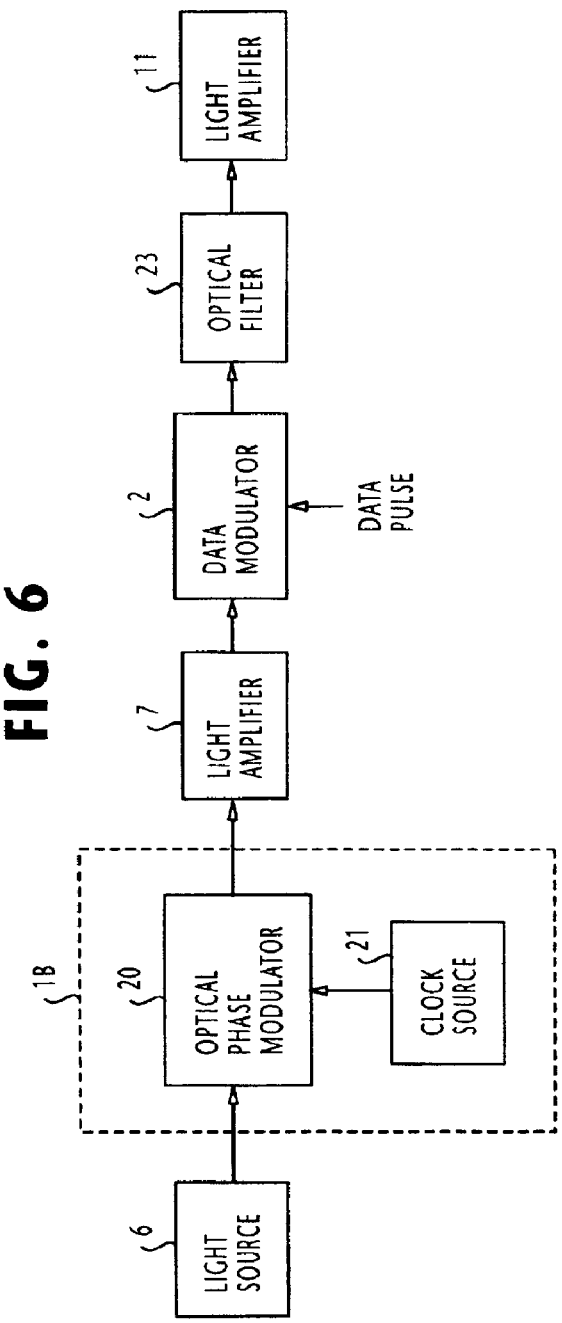
Figure 7:
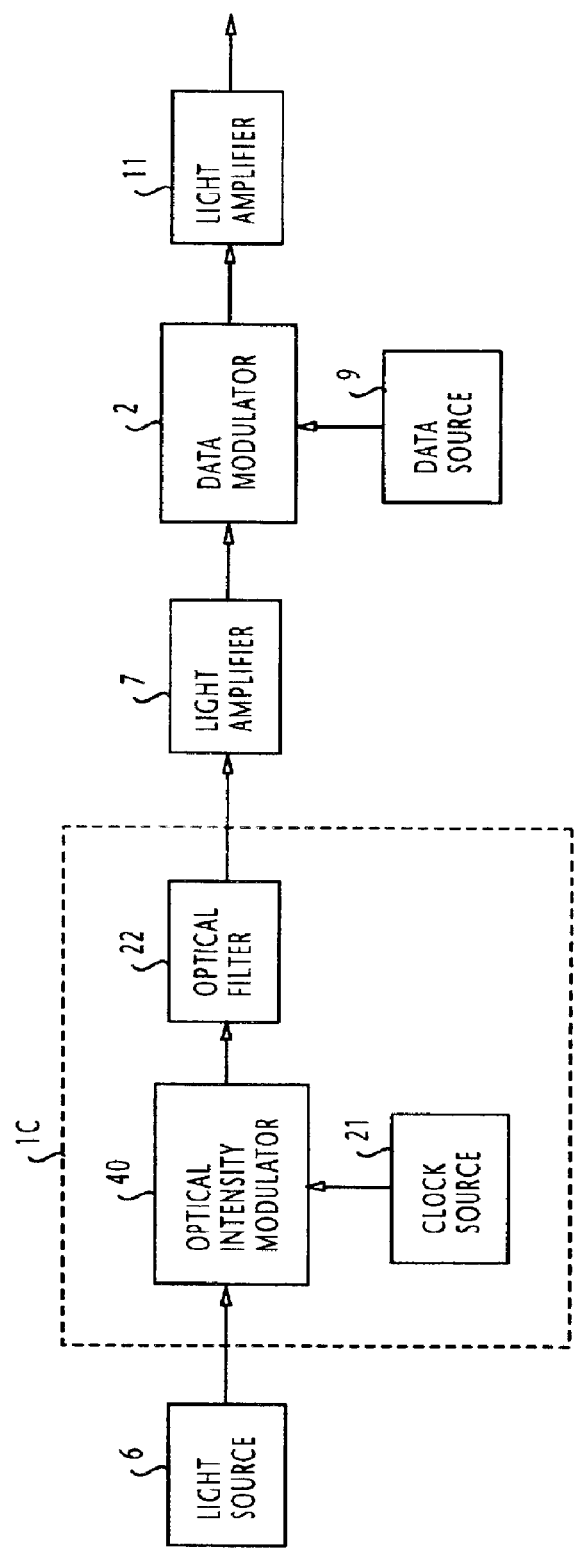

The first embodiment of the present invention can be modified as shown in FIGS. 5, 6 and 7. FIG. 5 shows an alternative embodiment in which the clock modulator 1A and the data modulator 2 are transposed with each other so that the carrier frequency optical signal is initially subjected to data modulation which is followed by clock modulation.

In FIG. 6, an optical filter 23 is used instead of the optical filter 22 of FIG. 2 and is connected to the output of data modulator 2. Clock modulator 1B is comprised only of the phase modulator 20 and clock source 21. Optical filter 23 is designed to pass the main lobe (see FIG. 3f) of the optical spectrum of the output of phase modulator 20.

FIG. 7 shows a variation of the first embodiment. This embodiment differs from the first embodiment in that an optical intensity modulator 40 is used instead of the phase modulator 20 of FIG. 2 for modulating the carrier frequency optical signal with the clock signal. Optical intensity modulator 40 has a phase chirp whose magnitude varies with intensity variations of the modulated optical signal. Intensity modulator 40 operates on a bias voltage at which its output signal diminishes to a near-zero point. Because of the presence of a phase chirp, no carrier suppression occurs. The same spectral components are contained in the intensity modulated signal as those of the output of phase modulator of FIG. 2. Optical filter 22 performs the same filtering operation on the intensity modulated optical carrier as it does on the phase modulated optical carrier as described above.

Figure 8:
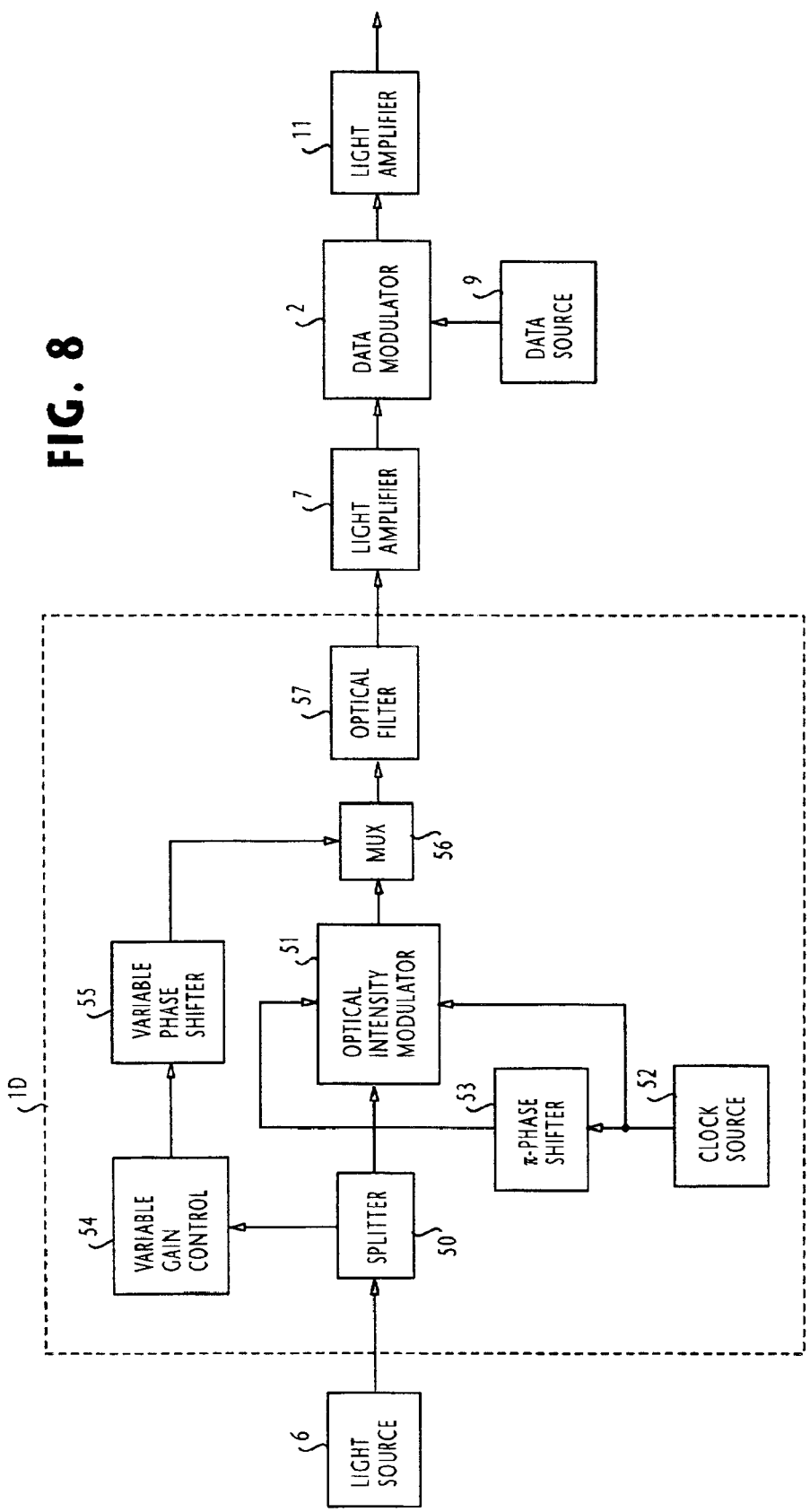
FIG. 8 is a block diagram of an optical transmitter according to a second embodiment of the present invention.
Figure 9A:
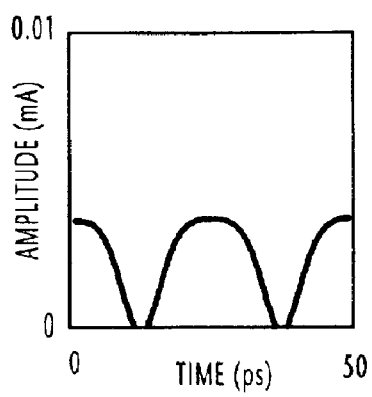
FIGS. 9a to 9f are graphic representations of the various operating characteristics of the optical transmitter of FIG. 8.
Figure 9B:
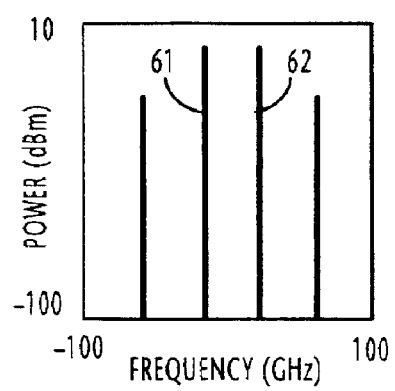

A second embodiment of the present invention is shown in FIG. 8. In this embodiment, the clock modulator 1D is comprised of an optical splitter 50 where the carrier frequency optical signal divides into two signals. One of the split signals is applied to an optical intensity modulator 51 which provides intensity clock modulation in a push-pull mode on the incident light using a pair of opposite-phase clock signals, one being supplied direct from a clock source 52 and the other via a π-phase shifter 53. Similar to the first embodiment, the frequency of the clock source 52 is $1/2^n$ (where n is an integer equal to or greater than unity) of the frequency of the fundamental sinusoidal component of the data pulse. Intensity modulator 51 is biased at a voltage at which the output signal of the modulator diminishes to a near-zero point. Because of the identical configuration to that of the prior art clock modulator, carrier suppression occurs at the output of the intensity modulator 51. FIG. 9a shows eye-pattern penalty of the output of intensity modulator 51. In FIG. 9b, the optical spectrum of the intensity modulated signal indicates that the carrier frequency component and the second sideband components are suppressed, leaving the first sideband components (indicated by spectral lines 61 and 62) and the third sideband components.

The second half of the split optical carrier frequency signals is used to generate the suppressed carrier frequency component. This is accomplished by combining the second carrier frequency signal with the output of intensity modulator 51 in a multiplexer 56 after gain and phase adjustments provided respectively by a variable gain controller 54 and a variable phase shifter 55.

Figure 9C:
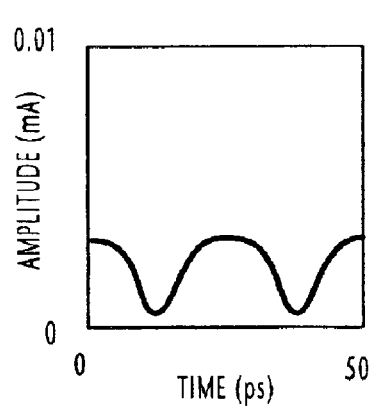
Figure 9D:
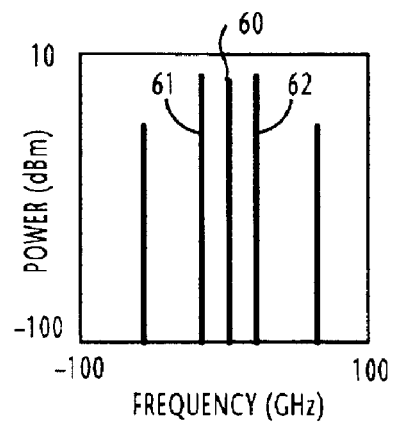

Variable gain controller 54 has a function equivalent to controlling the modulation index of the first embodiment. By adjusting the optical gain of the second carrier frequency signal, the amount of phase chirp between adjacent symbols in the combined optical carriers is controlled. FIGS. 9c and 9d show eye-pattern penalty and an optical spectrum of the output of intensity modulator 51, respectively. To ensure excellent immunity to fiber's nonlinearity, the variable gain controller 54 is adjusted so that its output power (as indicated by a spectral line 60) is approximately equal to the power of the first sideband components of the output of intensity modulator 51. Variable phase shifter 55 is controlled to align the phase of the carrier frequency signal with one of the first sideband components which is determined by a dispersion map of the optical transmission link.

Figure 9E:
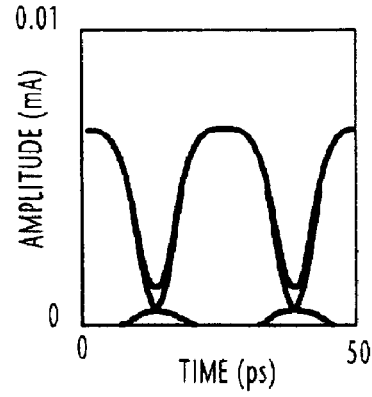
Figure 9F:
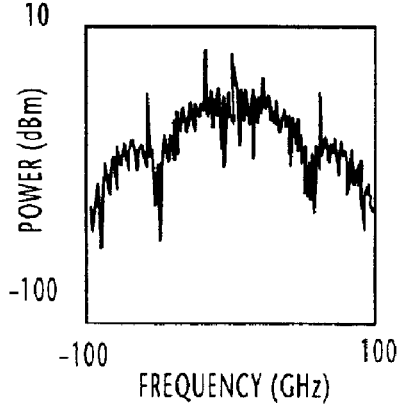

The output of the multiplexer 56 is coupled through an optical filter 57 to the data modulator 2. Optical filter 57 limits the optical spectrum of the clock modulated signal to the carrier frequency component and the first sideband components. Optical filter 57 may be located between the intensity modulator 51 and the multiplexer 56. Eye pattern penalty and optical spectrum of the output of data modulator 2 of the second embodiment are respectively shown in FIGS. 9e and 9f.

What is claimed is:

1. An optical clock modulator for use in an optical transmitter which modulates a continuous-wave optical carrier with an electrical data pulse, comprising:

a clock generator for producing a clock signal at $1/2^n$ (where n is an integer equal to or greater than unity) of the frequency of a fundamental sinusoidal component of the data pulse;

an optical modulator for performing a modulation on the optical carrier with said clock signal to produce a modulated optical carrier containing at least a carrier frequency component and first sideband components; and an optical filter for extracting said carrier frequency component and said first sideband components from said modulated optical carrier.

2. The optical clock modulator of claim 1, wherein said optical filter further extracts second sideband components.

3. The optical clock modulator of claim 1, wherein power levels of said first sideband components are substantially equal to power level of the carrier frequency component.

4. The optical clock modulator of claim 1, wherein said optical modulator is an optical phase modulator.

5. The optical clock modulator of claim 4, wherein said clock signal is a pure sine wave signal.

6. The optical clock modulator of claim 1, wherein said optical modulator comprises an optical intensity modulator having a phase chirp, the optical intensity modulator operating at a bias voltage at which an output signal of the optical intensity modulator diminishes to a near-zero point.

7. The optical clock modulator of claim 1, wherein said optical modulator comprises:

an optical splitter for splitting said continuous-wave optical carrier into first and second split optical signals;

an optical phase shifter for shifting a phase of said clock signal of said clock generator by a predetermined amount;

an optical intensity modulator for performing intensity modulation in a push-pull mode on said first split optical signal with the clock signal from said phase shifter and the clock signal from said clock generator;

gain adjustment means for adjusting a gain of said second split optical signal;

phase adjustment means for adjusting a phase of said second split optical signal; and a multiplexer for combining the gain- and phase-adjusted second split optical signal and the intensity modulated first split optical signal.

8. An optical clock modulator for use in an optical transmitter which modulates a continuous-wave optical carrier with an electrical data pulse, comprising:

a clock generator for producing a clock signal at $1/2^n$ (where n is an integer equal to or greater than unity) of the frequency of a fundamental sinusoidal component of the data pulse;

an optical modulator for performing a modulation on the optical carrier with said clock signal to produce a modulated optical carrier containing at least a carrier frequency component and sideband components; and an optical filter for extracting from the modulated optical carrier spectral components whose frequencies are equal to or lower than four times the frequency of said fundamental sinusoidal component of the data pulse.

9. The optical clock modulator of claim 8, wherein said optical modulator comprises an optical phase modulator.

10. The optical clock modulator of claim 8, wherein said optical modulator comprises an optical intensity modulator having a phase chirp, the optical intensity modulator operating at a bias voltage at which an output signal of the optical intensity modulator diminishes to a near-zero point.

11. The optical clock modulator of claim 8, wherein said optical modulator comprises:

an optical splitter for splitting said continuous-wave optical carrier into first and second split optical signals;

an optical phase shifter for shifting a phase of said clock signal of said clock generator by a predetermined amount;

an optical intensity modulator for performing intensity modulation in a push-pull mode on said first split optical signal with the clock signal from said phase shifter and the clock signal from said clock generator;

gain adjustment means for adjusting a gain of said second split optical signal;

phase adjustment means for adjusting a phase of said second split optical signal; and a multiplexer for combining the gain- and phase-adjusted second split optical signal and the intensity modulated first split optical signal.

12. The optical clock modulator of claim 8, wherein said clock signal is a pure sine wave signal.

13. The optical clock modulator of claim 8, wherein said optical filter extracts a carrier frequency component and first sideband components of the modulated signal.

14. The optical clock modulator of claim 13, wherein power levels of said first sideband components are substantially equal to power level of the carrier frequency component.

15. The optical clock modulator of claim 8, wherein said optical filter further extracts second sideband components of the modulated signal.

16. The optical clock modulator of claim 8, wherein said optical modulator is arranged to perform said modulation before said optical carrier is modulated with said data pulse.

17. The optical clock modulator of claim 8, wherein said optical modulator is arranged to perform said modulation after said optical carrier is modulated with said data pulse.

18. The optical clock modulator of claim 8, wherein said optical filter is arranged to perform said filtering operation before said optical carrier is modulated with said data pulse.

19. The optical clock modulator of claim 8, wherein said optical filter is arranged to perform said filtering operation after said optical carrier is modulated with said data pulse.

20. An optical clock modulation method for an optical transmitter in which data modulation is performed using a data pulse, comprising the steps of:

producing a clock signal at $1/2^n$ (where n is an integer equal to or greater than unity) of the frequency of a fundamental sinusoidal component of the data pulse;

performing a modulation on the optical carrier with said clock signal to produce a modulated optical carrier containing at least a carrier frequency component and first sideband components; and extracting said carrier frequency component and said first sideband components from said modulated optical carrier.

21. The optical clock modulation method of claim 20, wherein the extracting step further extracts second sideband components.

22. The optical clock modulation method of claim 20, wherein power levels of said first sideband components are substantially equal to power level of the carrier frequency component.

23. The optical clock modulation method of claim 20, wherein the modulation performing step comprises phase modulating said optical carrier.

24. The optical clock modulation method of claim 20, wherein said clock signal is a pure sine wave signal.

25. The optical clock modulation method of claim 20, wherein the modulation performing step comprises the steps of performing optical intensity modulation using an optical intensity modulator having a phase chirp and operating the modulator at a bias voltage at which an output signal of the modulator diminishes to a near-zero point.

26. The optical clock modulation method of claim 20, wherein the modulation performing step comprises the steps of:

splitting said continuous-wave optical carrier into first and second split optical signals;

phase shifting said clock signal by a predetermined amount;

performing an intensity modulation in a push-pull mode on said first split optical signal using the phase shifted clock signal and the clock signal which is not phase shifted; and combining the second split optical signal and the intensity modulated first split optical signal.

27. An optical clock modulation method for an optical transmitter in which data modulation is performed using a data pulse, comprising the steps of:

producing a clock signal at $1/2^n$ (where n is an integer equal to or greater than unity) of the frequency of a fundamental sinusoidal component of the data pulse;

performing a modulation on a continuous-wave optical carrier with said clock signal to produce a modulated optical carrier containing at least a center frequency spectral component; and performing a filtering operation on the modulated carrier so that the filtered carrier contains spectral components whose frequencies are equal to or lower than four times the frequency of said fundamental sinusoidal component of the data pulse.

28. The optical clock modulation method of claim 27, wherein the modulation performing step comprises the step of performing optical phase modulation.

29. The optical clock modulation method of claim 27, wherein the modulation performing step comprises the steps of performing optical intensity modulation using an optical intensity modulator having a phase chirp and operating the modulator at a bias voltage at which an output signal of the modulator diminishes to a near-zero point.

30. The optical clock modulation method of claim 27, wherein the modulation performing step comprises the steps of:

splitting said continuous-wave optical carrier into first and second split optical signals;

phase shifting said clock signal by a predetermined amount;

performing an intensity modulation in a push-pull mode on said first split optical signal using the phase shifted clock signal and the clock signal which is not phase shifted; and combining the second split optical signal and the intensity modulated first split optical signal.

31. The optical clock modulation method of claim 27, wherein said clock signal is a pure sine wave signal.

32. The optical clock modulation method of claim 27, wherein the filtering step extracts a carrier frequency component and first sideband components of the modulated signal.

33. The optical clock modulation method of claim 32, wherein the filtering step further extracts second sideband components of the modulated signal.

34. The optical clock modulation method of claim 27, wherein the modulation performing step is provided before said optical carrier is modulated with said data pulse.

35. The optical clock modulation method of claim 27, wherein the modulation performing step is provided after said optical carrier is modulated with said data pulse.

36. The optical clock modulation method of claim 27, wherein the filtering step is performed before said optical carrier is modulated with said data pulse.

37. The optical clock modulation method of claim 27, wherein the filtering step is performed after said optical carrier is modulated with said data pulse.

* * * * *